United States Patent
Spiegel

(10) Patent No.: US 11,256,385 B2
(45) Date of Patent: Feb. 22, 2022

(54) APPLICATION MENU MODIFICATION RECOMMENDATIONS

(71) Applicant: HEWLETT PACKARD ENTERPRISE DEVELOPMENT LP, Houston, TX (US)

(72) Inventor: Ofer Spiegel, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 954 days.

(21) Appl. No.: 14/915,294

(22) PCT Filed: Sep. 19, 2013

(86) PCT No.: PCT/US2013/060546
§ 371 (c)(1),
(2) Date: Feb. 29, 2016

(87) PCT Pub. No.: WO2015/041648
PCT Pub. Date: Mar. 26, 2015

(65) Prior Publication Data
US 2016/0209996 A1 Jul. 21, 2016

(51) Int. Cl.
*G06F 3/0482* (2013.01)
*G06F 9/451* (2018.01)
(Continued)

(52) U.S. Cl.
CPC ........ *G06F 3/0482* (2013.01); *G06F 3/04842* (2013.01); *G06F 3/04845* (2013.01); *G06F 9/453* (2018.02)

(58) Field of Classification Search
CPC ........ G06T 11/60; G06F 9/4443; G06F 9/455; G06F 3/048–04897
See application file for complete search history.

(56) References Cited

U.S. PATENT DOCUMENTS 5,420,975 A * 5/1995 Blades ................. G06F 3/0482
715/811
5,673,405 A * 9/1997 Tange ................. G06F 3/04817
715/745

(Continued)

OTHER PUBLICATIONS

Ehmke, C. et al., Identifying Web Usability Problems From Eye-tracking Data, Proceedings of HCI 2007, Jun. 29, 2007, 10 pages.
(Continued)

*Primary Examiner* — Kieu D Vu
*Assistant Examiner* — Alvaro R Calderon, IV

(57) ABSTRACT

In one example of the disclosure, a menu and a plurality of menu elements included within the menu are identified within a software application. A set of menu traversal tracking measures are performed with respect to a target element from the plurality. The set of measures includes, responsive to identifying a user menu traversal action that is not a selection of the target element, incrementing the value of a counter. The set includes, responsive to identifying a user menu traversal action that is a selection of the target element, recording the value of the counter in association with data indicative of the target element. A recommendation to modify a first element among the plurality is generated in consideration of the recorded value.

19 Claims, 8 Drawing Sheets

(51) Int. Cl.
*G06F 3/04842* (2022.01)
*G06F 3/04845* (2022.01)

(56) References Cited

U.S. PATENT DOCUMENTS

| | | | | |
|---|---|---|---|---|
| 5,864,605 | A * | 1/1999 | Keshav | H04M 3/493 379/67.1 |
| 6,121,968 | A * | 9/2000 | Arcuri | G06F 3/0482 715/825 |
| 6,266,060 | B1 * | 7/2001 | Roth | G06F 3/0482 715/206 |
| 6,583,797 | B1 * | 6/2003 | Roth | G06F 3/0482 715/810 |
| 6,828,992 | B1 * | 12/2004 | Freeman | H04B 1/202 715/733 |
| 6,904,449 | B1 | 6/2005 | Quinones | |
| 6,938,216 | B1 * | 8/2005 | Ishisaki | G06F 3/0482 715/817 |
| 7,490,319 | B2 * | 2/2009 | Blackwell | G06F 11/3664 717/124 |
| 8,078,976 | B2 * | 12/2011 | Ban | G06F 3/0482 715/747 |
| 8,166,412 | B2 * | 4/2012 | Jain | G06F 3/04842 715/700 |
| 8,239,239 | B1 | 8/2012 | Malhotra et al. | |
| 8,543,900 | B1 * | 9/2013 | Kent | H04L 67/22 705/14.43 |
| 8,577,911 | B1 * | 11/2013 | Stepinski | G06F 17/30 707/765 |
| 8,578,340 | B1 * | 11/2013 | Daudel | G06F 9/45504 710/266 |
| 2003/0225730 | A1 * | 12/2003 | Warner | H04M 3/493 |
| 2004/0015500 | A1 * | 1/2004 | Pugliese | G06F 3/0482 |
| 2004/0095383 | A1 | 5/2004 | Pfeifer et al. | |
| 2005/0034148 | A1 * | 2/2005 | Jaeger | G06F 3/0481 725/14 |
| 2005/0071026 | A1 * | 3/2005 | Jaeger | G06F 9/453 700/94 |
| 2005/0183037 | A1 * | 8/2005 | Kuenzner | B60K 35/00 715/825 |
| 2006/0203006 | A1 * | 9/2006 | Georgeson | G06T 7/20 345/619 |
| 2006/0224989 | A1 * | 10/2006 | Pettiross | G06F 3/0481 715/779 |
| 2006/0242638 | A1 * | 10/2006 | Lew | G06F 9/451 717/168 |
| 2006/0259861 | A1 * | 11/2006 | Watson | G06F 17/3064 715/705 |
| 2007/0033275 | A1 * | 2/2007 | Toivonen | G06F 17/30884 709/224 |
| 2008/0005700 | A1 * | 1/2008 | Morikawa | G06F 3/0482 715/841 |
| 2008/0120153 | A1 * | 5/2008 | Nonemacher | G06F 8/10 705/7.26 |
| 2008/0155472 | A1 * | 6/2008 | Runge | G06F 17/279 715/811 |
| 2009/0150930 | A1 * | 6/2009 | Sherwin | G11B 27/031 725/35 |
| 2009/0163183 | A1 * | 6/2009 | O'Donoghue | G06Q 30/02 455/414.1 |
| 2010/0095208 | A1 * | 4/2010 | White | G06F 17/30905 715/704 |
| 2010/0131927 | A1 * | 5/2010 | Pinjala | G06F 9/451 717/125 |
| 2010/0174992 | A1 * | 7/2010 | Portman | G06F 9/451 715/738 |
| 2010/0318905 | A1 | 12/2010 | Rakesh | |
| 2011/0028138 | A1 * | 2/2011 | Davies-Moore | G06F 3/04817 455/418 |
| 2011/0173589 | A1 * | 7/2011 | Guttman | G06F 17/30873 717/125 |
| 2011/0225569 | A1 * | 9/2011 | Beaty | G06F 11/3414 717/127 |
| 2011/0246879 | A1 * | 10/2011 | White | G06F 17/3089 715/704 |
| 2012/0198364 | A1 * | 8/2012 | Bornheimer | G06F 8/38 715/762 |
| 2012/0210215 | A1 | 8/2012 | Chrabaszcz | |
| 2012/0227000 | A1 | 9/2012 | McCoy et al. | |
| 2012/0317481 | A1 * | 12/2012 | Armstrong | G06F 9/4446 715/707 |
| 2013/0019171 | A1 * | 1/2013 | Mounty | G06F 11/3688 715/704 |
| 2013/0055218 | A1 * | 2/2013 | Schwartz | G06F 11/3688 717/131 |
| 2013/0110848 | A1 * | 5/2013 | Svendsen | G06F 17/30029 707/748 |
| 2013/0218315 | A1 * | 8/2013 | Jaeger | G06F 9/453 700/94 |
| 2013/0219220 | A1 * | 8/2013 | Kraus | G06F 11/263 714/32 |
| 2013/0290939 | A1 * | 10/2013 | Eliassaf | G06F 8/30 717/135 |
| 2013/0332398 | A1 * | 12/2013 | Wu | G06N 99/005 706/12 |
| 2013/0339901 | A1 * | 12/2013 | Kirkham | H04M 1/72586 715/810 |
| 2014/0132571 | A1 * | 5/2014 | Zeng | G06F 17/30 345/178 |
| 2015/0007070 | A1 * | 1/2015 | Saaroni | G06F 9/4443 715/763 |
| 2015/0074609 | A1 * | 3/2015 | Lanzkron | G06F 3/04842 715/838 |
| 2015/0161652 | A1 * | 6/2015 | Schnabl | G06Q 30/0242 705/14.41 |

OTHER PUBLICATIONS

International Search Report and Written Opinion, PCT Patent Application No. PCT/US2013/060546, Jun. 23, 2014, 9 pages.
"Clickheat, The Tool That Warms Your Visitors' Mouse Activities", DugWood, retrieved from the Internet on Jul. 3, 2018, 1 page. <https://www.dugwood.com/clickheat/index.html>.
ClickTale, "Answer Anything", retrieved from the Internet on Aug. 22, 2018, 6 pages. <https://www.clicktale.com/solutions/>.
Crazy Egg, "Crazy Egg Website Optimization Software", retrieved from the Internet on Jul. 3, 2018, 8 pages, <https://crazyegg.com/overview>.
Google, "Google Analytics Solutions-Marketing Analytics & Measurement", retrieved from the internet on Jul. 3, 2018, 13 pages. <https://www.google.com/analytics/>.
Norman, et al., "The Psychology of Menu Selection: Designing Cognitive Control at the Human/computer Interface", 1991, 295 pages.
Techsmith, "Morae", retrieved from the Internet on Jul. 3, 2018, 4 pages. <https://www.techsmith.com/morae.html>.

* cited by examiner

| Menu | Menu Elements | Path | Traversal Actions Counter Value | Occurences |
|---|---|---|---|---|
| Menu (1) | Menu Element (1) | 1-A-2 | 1 | 40 |
| Menu (1) | Menu Element (1) | 2 | 6 | 10 |
| Menu (1) | Menu Element (1) | 3-B-2 | 5 | 2 |
| Menu (1) | Menu Element (2) | 1 | 2 | 86 |
| Menu (1) | Menu Element (3) | 1-A | 2 | 30 |
| Menu (1) | Menu Element (3) | 1-B-A | 2 | 40 |

| Menu | Menu Elements | Expected Counter Value | Average Counter Value |
|---|---|---|---|
| Menu (1) | Menu Element (1) | 1 | 2.615 |
| Menu (1) | Menu Element (2) | 1 | 1 |
| Menu (1) | Menu Element (3) | 2 | 2.571 |

Data Repository

APPLICATION MENU MODIFICATION RECOMMENDATIONS

CROSS-REFERENCE TO RELATED APPLICATION

This application is a U.S. National Stage Application of and claims priority to International Patent Application No. PCT/US2013/060546, filed on Sep. 19, 2013, and entitled "APPLICATION MENU MODIFICATION RECOMMENDATIONS," the entire contents of which are hereby incorporated in its entirety.

BACKGROUND

Web applications and other software applications frequently provide a graphical user interface menu display through which a user of the application can receive information about the application or offerings of the application, and interact with the application to exercise various functions of the application.

DRAWINGS

DETAILED DESCRIPTION

Figure 1:
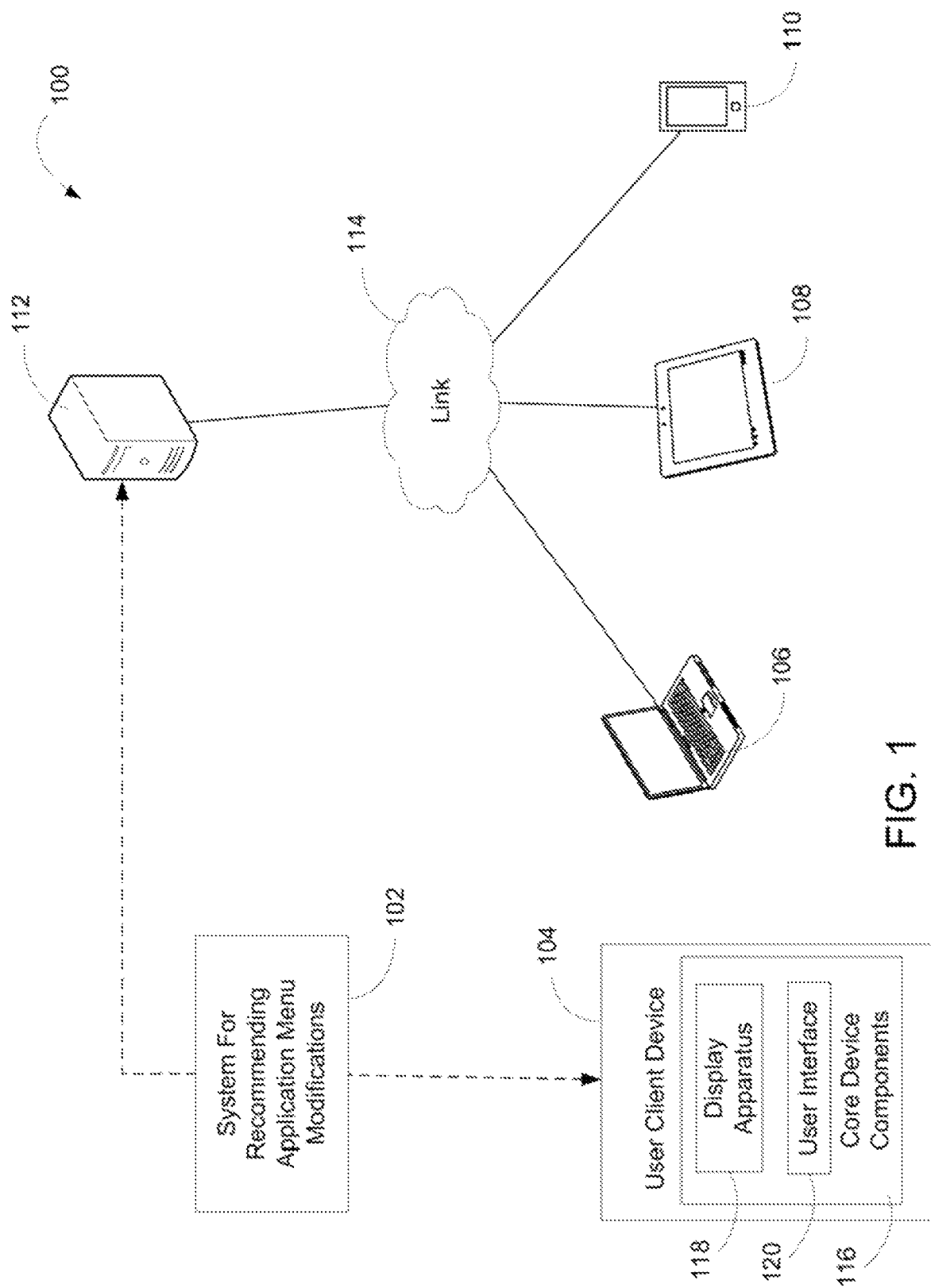
FIG. 1 is a block diagram depicting an example environment in which various embodiments may be implemented.

INTRODUCTION: One of the main characteristics of a good menu user interface and overall good user experience is the level of efficiency achieved by the user as he or she traverses the menu to procure, information or perform a task with minimal effort and time. However, designing a web application to optimize menus within the web application can be challenging. While there may be a general desire for the web application to provide robust functionality to the user via a single page or display, there typically are design constraints that impact the menu structure. For example, design of a web application menu may be impacted by a limited amount of space that is available to be allocated to the menu relative to the rest of the page or display, e.g., due to the size of the monitor, screen, or other display device that the application will cause the web page or view to be displayed upon. In another example, web application menu design may be impacted by a rule that that text or icons within the menu be of at least a certain minimum size in order that a human operator that views the menu can perceive, comprehend, and interact with the menu. In another example, web application menu design may be impacted by a constraint that a highly complex menu (e.g., a menu with a high number of tiers or sub-menus) may be unsatisfactory as at a certain point of complexity benefits of a robust menu can be outweighed by a loss of usability.

To address these issues, various embodiments described in more detail below provide for a system and a method to recommend application menu modifications. In an example, the application that includes the menu is a web application. It should be noted, however, that while the disclosure is discussed frequently with reference to web applications, the teachings of the present disclosure are not so limited and can be applied to any software application. Examples described herein may operate by identifying, within a software application, a menu and a plurality of menu elements included within the menu. A set of menu traversal tracking measures are performed with respect to a target menu element that is one of the plurality of menu elements. The set of measures includes incrementing the value of a counter responsive to identifying a user menu traversal action that is not a selection of the target element. The set of measures additionally includes recording the value of the counter responsive to identifying a user menu traversal action that is a selection of the target element. The value of the counter is recorded in in association with data indicative of the target element. A recommendation to modify a first menu element among the plurality of menu elements is generated in consideration of the recorded value.

In an example, the menu is a graphical user interface menu, and the plurality of menu elements are graphical user interface menu elements. in an example, the modification of the first element is a modification to relocate the first element to a new location position within the menu. In an example, the consideration of the recorded value includes a comparison of the recorded, value against an expected counter value for the target element.

In an example, the set of traversal tracking measures is performed successive times or iteratively, with each of the plurality of menu elements at some point being designated as the target element such that each of the plurality of elements will have an associated recorded value. In this example, the recommendation can be generated in consideration of recorded values of the counter that are associated with the plurality of elements. In another example, the set of tracking measures is performed for each of a plurality of users, and the recommendation to modify the first element is generated in consideration an average of recorded values of the counter.

In an example, the set of tracking measures may include setting the counter to a start value responsive to detecting repetitive or subsequent selections or activations of a same element from the plurality of menu elements over a specific period of time. In an example, the set of tracking measures includes setting the counter to a start value responsive to detecting a user action to cause loading of a new page display. In an example, the set of tracking measures may include setting the counter to a start value after identification of user menu traversal action that is a selection of the target element.

In this manner, embodiments of this disclosure present an automated and efficient manner to automatically recommend application menu modifications. Embodiments of the disclosure can recommend the menu modifications by taking into account distinct patterns of user behavior in a context that indicates the inability of the end-user to find what he or she is looking for in the existing menu structure. Designers and users of software applications, and of the computing devices that execute or access such applications, will appreciate the ability to improve menu efficiency. Such advantages of the disclosure will cause customer satisfaction with software applications that have the optimized menus, and with the computing devices that execute or access the optimized software applications, to increase.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of recommending application menu modifications. The fourth section, labeled as "Operation," describes steps taken to implement various embodiments.

ENVIRONMENT: FIG. 1 depicts an example environment 100 in which embodiments may be implemented as system for recommending application menu modifications 102. Environment 100 is show to include client devices 104, 106, 108, and 110, and a server device 112. components 104-112 are interconnected via link 114.

Link 114 represents generally any infrastructure or combination of infrastructures configured to enable an electronic connection, wireless connection, or other connection to enable data communication between components 104-112. Such infrastructure or infrastructures may include, but are not limited to, one or more of a cable, wireless, fiber optic, or remote connections via telecommunication link, an infrared link, or a radio frequency link. For example, link 114 may represent the internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 104-110 represent generally any computing device with which a user may interact to communicate with other client devices and server device 112 via link 114. Server device 112 represents generally any computing device configured to serve an application and corresponding data for consumption by client devices 104-110.

Client device 104 is shown to include core device components 116. Core device components 116 represent generally the hardware and programming for providing the computing functions for which device 104 is designed. Such hardware can include a processor and memory, a display apparatus 118, and a user interface 120. The programming can include an operating system and applications. Display apparatus 118 represents generally any combination of hardware and programming configured to exhibit or present a message, image, view, or other presentation for perception by a user, and can include, but is not limited to, a visual, tactile or auditory display. In examples, the display device may be or include a monitor, a touchscreen, a projection device, a touch/sensory display device, or a speaker. User interface 120 represents generally any combination of hardware and programming configured to enable interaction between a user and user client device 104 such that the user may effect operation or control of user client device 104. In examples user interface 120 may be, or include, a keyboard, mouse, keypad, or a mouse. In some examples, the functionality of display apparatus 118 and user interface 120 may be combined, as in the case of a touchscreen apparatus that may enable presentation of images at user client device 104, and that also may enable a user to operate or control functionality of user client device 104.

System 102, discussed in more detail below, represents generally a combination of hardware and programming configured to enable generation of recommendations to modify application menus. Briefly, system for recommending application menu modifications 102 is configured to identify, within a software application, a graphical user interface menu and a plurality of menu elements included within the menu. System 102 is to perform a set of menu traversal tracking measures with respect to a target element from the plurality. The menu traversal tracking measures may include incrementing the value of a counter responsive to identifying a user menu traversal action that is not a selection of the target element. The menu traversal tracking measures may include recording the value of the counter in association with data indicative of the target element, responsive to identifying a user menu traversal action that is a selection of the target element. System 102 is to generate, in consideration of the recorded value, a recommendation to modify a first element among the plurality of menu elements.

System 102 may be wholly integrated within core device components 116. System 102 may be implemented as a component of server device 112 where it takes action based in part on data received from core device components 116 via link 114. System 102 may be distributed across client device 104 and server device 112. For example, identifying a menu and a plurality of menu elements within a software application, and performing the set of menu traversal tracking measures with respect to a target element from the plurality may be performed on client device 104, while generating a recommendation to modify a menu element in consideration of a recorded counter value, may be performed by server device 112. Other distributions of system 102 across client device 104 and server device 112 are possible and contemplated by this disclosure. It is noted that all or portions of the system for recommending application menu modifications 102 may also be included on client devices 106, 108 or 110.

It should be noted that there is no requirement that system 102 and the application that includes the menu (in whole or in part) necessarily reside on a same computing device. In an example, the application that includes the menu may be a standalone client application (e.g., a word processor application) that executes at client device 106, and client device 106 transmits menu traversal action data to the system 102 executing at client device 104 for tracking. In another example, the application that includes the menu may be a standalone client application that executes at client device 110, and client device 110 transmits menu traversal action data to the system 102 executing at server device 112. In yet another example, the application may be a web application (e.g., a webmail application or any other client/server based application) that is accessed by a user at client device 104, with the application and the system 102 both being provided or served from server device 112. In another example, the application that includes the menu may be a web application or any other client/server based application that is accessed by a user at client device 104, with system being served or hosted from server device 102, and the application being provided or served from another server device that is separate and distinct from server device 102.

Figure 2:
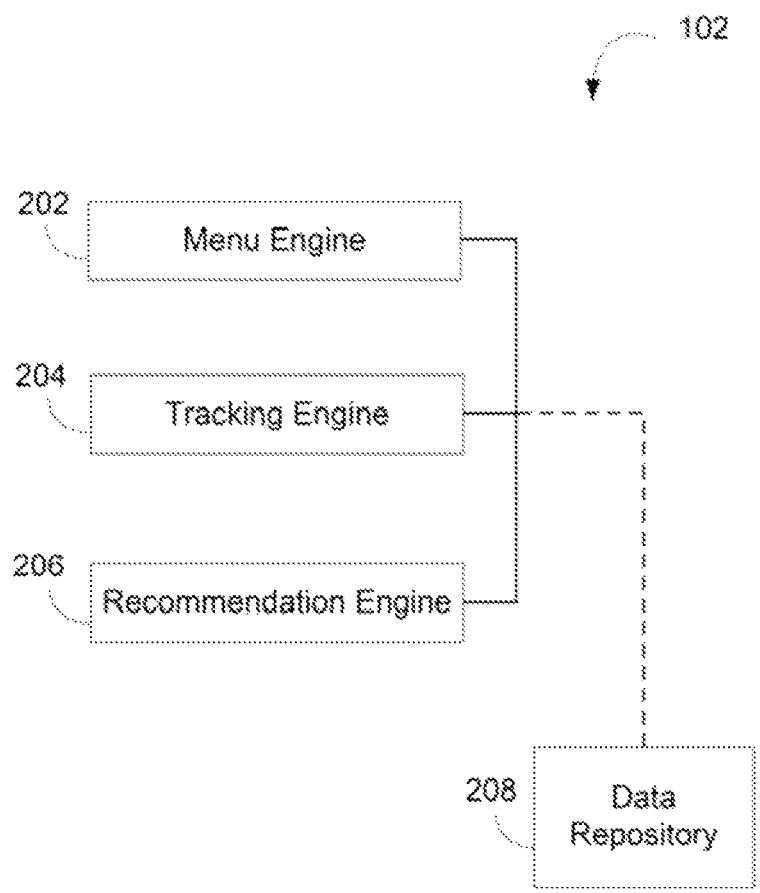
FIG. 2 is a block diagram depicting an example of a system to recommend application menu modifications.

COMPONENTS: FIGS. 2-4 depict examples of physical and logical components for implementing various embodiments, in FIG. 2 various components are identified as engines 202, 204, 206. In describing engines 202, 204, 206 focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programing may be code stored on that memory and executable by the processor to perform the designated function.

FIG. 2 is a block diagram depicting components of system for recommending application menu modifications 102. In this example, system 102 includes menu engine 202, tracking engine 204, and recommendation engine 206. In performing their respective functions, engines 202, 204, 206 may access data repository 208. Repository 208 represents generally any memory accessible to system 102 that can be used to store and retrieve data.

Menu engine 202 represents a combination of hardware and programming configured to identify, within a software application, a menu and a plurality of menu elements included within the menu. As used herein, "software application" and "application" are used synonymously and refer generally to any computer software application, firmware application, web application, or other programming that executes at, or is accessible at, a computing device. A "web application" refers generally to a computer software application or web page that is coded in a browser-supported language (such as XML, HTML, or HTML with JavaScript) and is reliant on a web browser application to render the application executable (or in the case of a web page, presentable). Examples of web applications are web pages, webmail, online search engines, online sale and auction sites, and wikis.

As used herein, a "menu" refers generally to a list of options or commands to be displayed or presented to a user by a computer. As used herein, to "display" refers generally to exhibiting or presenting for perception by a user, and includes, but is not limited to visual, auditory and tactile presentations. As used herein, a "traversal" or "traversal action" refers generally to a user-initiated movement, or navigation, within or across a displayed menu. In examples, a traversal or traversal action may be initiated by a user a number of methods, including but not limited to entering an identifier for the desired menu element from a keyboard, positioning a cursor by using a keyboard, mouse, or remote control, using an electromechanical input device, such as a light pen, touching a display screen with a finger, or speaking to a voice-recognition system. As used herein, "menu element" refers generally to a choice or item presented in the menu for user selection. In an example, the menu is a graphical user interface menu, and the plurality of menu elements are graphical user interface menu elements. In examples wherein the menu is a graphical user interface menu, a menu element may be a visual component of a graphical user interface menu designed for user selection or manipulation. In examples, menu elements included within a menu may be selected by a user by a number of methods, including but not limited to entering an identifier for the desired menu element from a keyboard, positioning a cursor by using a keyboard, mouse, or remote control, using an electromechanical input device, such as a light pen, touching a display screen with a finger, or speaking to a voice-recognition system. In examples menu elements may be or include, but are not limited to, buttons, check boxes, combo boxes, icons, radio buttons, scrollbars, sliders, status bars, text boxes, toolbars, tooltips, and dialog boxes.

Tracking engine 204 represents a combination of hardware and programming configured to perform a set of menu traversal tracking measures with respect to a target element from the plurality of menu elements. A counter is established or identified, and the counter is utilized for tracking user traversal actions taken in advance of user selection of the target menu element. As used herein, a "counter" refers generally to any combination of hardware and programming configured to count menu traversal user actions. The set of tracking measures performed includes a step of incrementing the value of a counter responsive to identifying a user menu traversal action that is not a selection of the target element. In an example, the counter is incremented, e.g., from an integer zero to an integer one, and then to an integer two, etc., responsive to receipt of data indicative of the user menu traversal action. In this manner there is a tracking of erroneous or faulty traversal actions taken by a user with respect to the target element.

The value of the counter is recorded responsive to receipt of data indicative of a user menu traversal action that is a selection of the target element. In this manner, after having tracked a number of erroneous or faulty traversal actions taken by a user with respect to the target element, the tracking engine discontinues the tracking routine with respect to the target item, and records a number of erroneous or faulty traversal actions. The tracking engine 204 then stores the end-of-routine value of the counter in association with data indicative of the target element. In this manner the count of menu traversal actions for this user routine is stored such that the data can later be retrieved for analysis of multiple routines or routines by multiple users with respect to the target element.

In an example, the set of tracking measures may include setting the counter to a start value responsive to detecting a repetition in selection (sometimes referred to herein as "repetitive selection") of a same element from the plurality over a specific period of time.

In an example, the menu and the plurality of menu elements are to appear in a first page display, and the set of tracking measures includes setting the counter to a start value responsive to detecting a user action to cause loading of a second page display. As used herein a "page" generally refers to content that can be accessed at a specific internet address, e.g., a specific URL. In this manner, the tracking engine 204, upon detecting user traversal to a new web page, may discontinue the then-current tracking sequence or routine, and reset the counter to a start value to begin a new traversal action routine or sequence.

In another example, the set of tracking measures includes setting the counter to a start value after identification of a user menu traversal action that is a successful selection of the target element. In an example, tracking engine 204 may reset the counter to a start value "zero" upon identifying or receiving data indicative of a user menu traversal action of selecting the target menu element. In this manner, the tracking engine 204 may reset the counter to ready for a new tracking sequence or routine upon recognizing that the user in the then-current sequence or routine has successfully found and selected the target menu element.

The recommendation engine 206 is configured to generate, in consideration of the counter value that is recorded upon successful selection of the target element, a recommendation to modify a first element among the plurality of menu elements. In an example, the recommendation is generated according to a rule that includes as a factor a recorded value of the counter. In a particular example, the recommendation may be generated according to the rule if the recorded value of the counter upon successful selection of a menu element is >(X), that menu element is recommended for modification, wherein, "X" is a variable representing a number greater than zero. In an example, the generated modification recommendation may be a recommendation to relocate the identified first element to a new location or position within the menu. In an example in which the menu is included within a web page, the new position or location is in or within that same web page.

In an example, the tracking engine 204 causes the set of traversal tracking measures to be performed successive times, such that each of the plurality of menu elements is at some point to be designated as the target element. In this manner, each of the plurality of menu elements will have an associated recorded counter value. In this example, the recommendation engine can in turn generate the modification recommendation in consideration of the recorded values, e.g., according to a rule that has as factors recorded values of the counter associated with each of the plurality of menu elements. In a particular example, the modification recommendation may be generated according to the rule:

identify menu elements with a successful selection counter recorded value >(X) ("IMEs"), and recommend for modification the (Y) IMEs with the highest recorded counter values wherein, "X" and "Y" are variables representing numbers greater than zero.

In another example, the recommendation engine 206 may, in generating the recommendation, apply a rule that compares the recorded counter value for a menu element against a stored expected counter value for the target element. In a particular example, the recommendation may be generated according to the rule:

if the recorded value of the counter upon successful selection of a menu element (X) is >expected counter value (Y), that menu element is recommended to be moved to a new location within the menu, wherein, "X" and are each variables representing numbers greater than zero. In this manner the recommendation engine may, by considering the differences between the recorded counter values and the expected counter value for each element, determine that a first menu element among the plurality is responsible for a high number of user menu traversal errors. Accordingly, in this example the recommendation engine may generate the recommendation to modify the first element by relocating it to a new position within the menu.

In another example, the tracking engine performs the set of menu traversal tracking measures for each of a plurality of users, and thereby may record multiple counter values for one or more menu elements. This example allows for utilizing a large sample of user of the menu so as to reduce the impact of a particular user's menu traversal difficulties that may not be shared by the aggregate user set. In an example, the recommendation module may generate a recommendation to modify a first element among the plurality based upon a rule that includes as a factor an average of the multiple recorded values of the counter that recorded in connection with user menu traversals by multiple users. In a particular example, the recommendation may be generated according to the rule:

if the average recorded value of the counter upon successful selection of a menu element is >(X), that menu element is recommended for modification, wherein, "X" is a variable representing a number greater than zero.

In yet another example, system 102 generates a recommendation to relocate a menu element, and automatically provides a recommended menu location for relocation of the menu element. In this example, the tracking engine 204 is to perform the set of menu tracking measures for each of a plurality of traversal runs, with the set including for each traversal run, recording a menu path that a user traversed in order to reach the target element. As used herein, a "traversal run" refers generally to a sequence, series, or cycle that ends with selection or activation of a target menu element. As used herein, a "menu path" refers generally to a sequence, route, track, course, or itinerary of user menu traversal actions. The tracking engine 204 is to calculate, for each of the target elements, a number of occurrences of each menu path traversed during the plurality of traversal runs. For each of the target elements, an average of the recorded values of the counter is compared against an expected counter value to determine whether the target element position being evaluated is deemed suboptimal as the target element position has an average recorded value of the counter that exceeds the expected counter value. In an example, the recommendation module 206 may generate a recommendation to relocate a first element among the target elements identified as suboptimal to a new position within the menu according to the rule:

relocate the first element to a new position, included within the path to the first element, that has the highest number of occurrences.

Figure 3A:
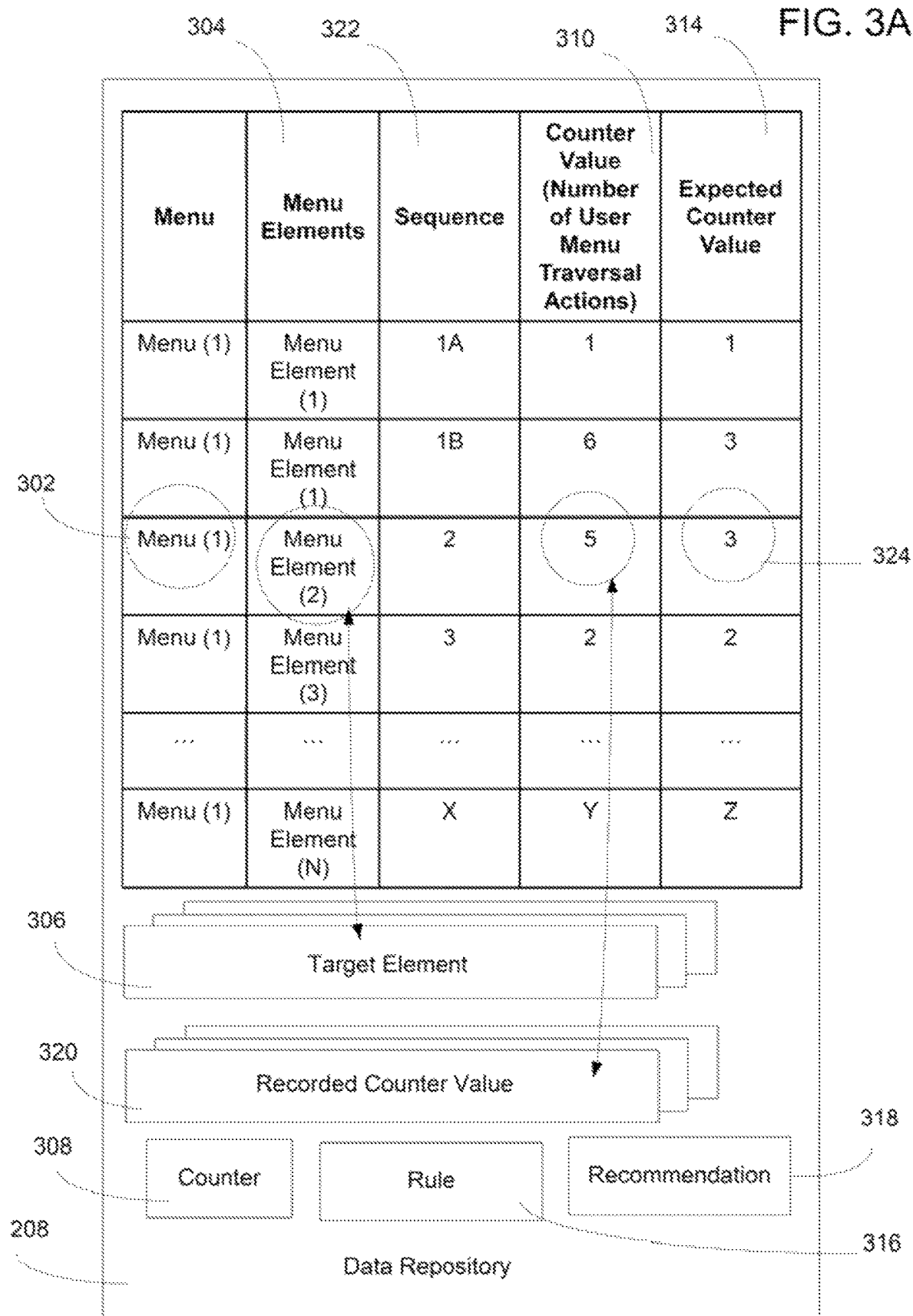
FIG. 3A is a block diagram depicting an example data structure for application menu modification recommendations.
Figure 4:
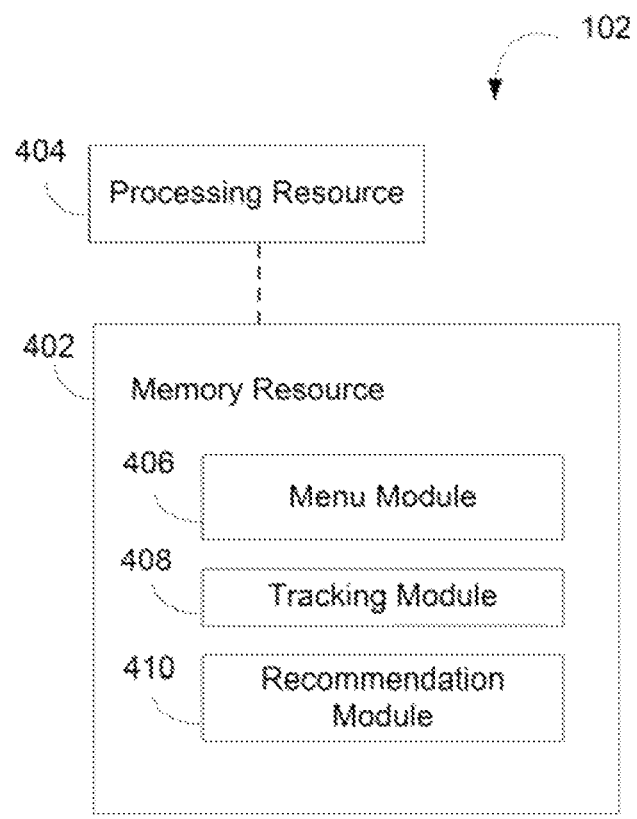
FIG. 4 is a block diagram depicting a memory resource and a processing resource according to an example.

FIG. 3A depicts an example implementation of data repository 208. In this example, repository 208 includes data indicative of a menu 302, of menu elements 304, of a then-current target element 306, of a counter 308, of a current recorded counter value 320, of historical recorded counter values 310, of expected counter values 314, of a rule 316, and of a recommendation 318. Referring back to FIG. 2 in view of FIG. 3A, in an example, menu engine 202 identifies, within a software application display, a menu 302, and a plurality of menu elements 304 included within the menu 302.

Tracking engine 204 in turn performs a set of measures for tracking of user menu traversals. In this example, one of the measures from the set is to iteratively designate a menu element from the plurality of menu elements 304 as a currently considered target element 306. Another measure from the set of actions is to, responsive to identifying a user menu traversal action that does not include activation of the currently considered target element 306 (e.g., an unsuccessful or erroneous traversal action), increment the value of a counter 308. Another measure from the set is to, responsive to identifying a user menu traversal action that includes a successful activation of the currently considered target element 306, record in a database (e.g., data repository 208) the then-current value 320 of the counter. The recorded counter value 320 indicates the number of user menu traversal actions taken in succeeding to activate the target element 306. In this example the recorded counter value of "5" 320 is recorded in data repository 208 in association with a "Menu Element (2)" identifier for the then-current target element 306. In an example, the tracking engine 204 may reset the counter to a start value "zero" upon detection that the tracked menu traversal actions have resulted in successful activation of then-current target menu element 306.

Recommendation engine 206 in turn generates, according to a formula or rule 316 that includes as a factor the recorded value 308, a recommendation 318 to modify a menu element among the plurality of menu elements 304. In this example, the applied rule 316 includes a comparison of the recorded value 308 against an expected counter value 324 for the then-current target element 306.

In an example, the tracking engine 204 is to perform the set of tracking measures for each of a plurality of users, and the rule 316 considered by the recommendation engine 206 includes as a factor an average of recorded values of the counter. In yet another example, the tracking engine 204 is to perform the tracking measures iteratively, or successively 322, with each of the plurality of menu elements 304 at some point designated as a target element 306 such that each of the plurality of elements 304 has an associated recorded value 310, and such that the rule 316 to be applied by the recommendation engine 206 includes as factors recorded values of the counter for each of the menu elements 204 of the plurality.

Figures 3B, 3C:
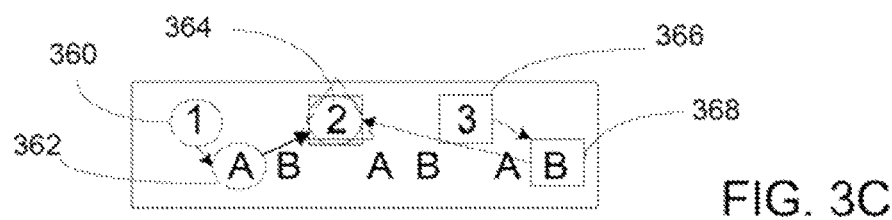
FIG. 3B is a block diagram depicting an example data structure for application menu modification recommendations.
FIG. 3C is a block diagram depicting examples of application menu traversal.

FIG. 3B, in view of FIG. 3C, depicts another example implementation of data repository 208. In this example, repository 208 includes data indicative of a menu 302 ("Menu 1"), of menu elements ("Menu Elements (1)-(3)") 304, of traversal paths 350, of traversal action counter values 310, of path occurrences 352, of expected counter values 314, and average counter values 354.

In the example of FIG. 3B, it is assumed Menu (1) has a menu structure as shown in FIG. 3C. Accordingly, for purposes of describing FIG. 3B a first traversal path 350 (denoted with circles in FIG. 3C) "1-A-2" represents a three-step path from a first tier graphical user interface position "1" 360, to a second tier (or child) position "1-A" 362, and then to a first tier position "2" 364. In this example a second traversal path 350 "3-B-2" (denoted with squares in FIG. 3C) represents a three-step path from a first tier graphical user interface position "3" 366, to a second tier (or child) position "3-B" 368, and then to a first tier position "2" 364. A third traversal path 350 (denoted with a triangle in FIG. 3C) "2" represents a one-step path directly to a first tier graphical user interface position "2" 364.

Returning to FIG. 38 in view of FIGS. 2 and 3C, in an example, menu engine 202 identifies, within a software application display, a menu 302, and a plurality of menu elements 304 included within the menu 302. Tracking engine 204 in turn performs iteratively, for each of a plurality of menu elements 304, a set of measures for tracking of user menu traversals. The measures to be performed include designating a menu element from the plurality as a target element. The measures include, responsive to identifying a user menu traversal action that does not include activation of the then-named target element, incrementing the value of a counter. The measures include, responsive to identifying a user menu traversal action that includes an activation of then-named target element, recording the value of the counter 310 in a database 208 in association with an identifier 304 for the target element.

Continuing with the example of FIG. 3B in view of FIGS. 2 and 3C, the tracking engine 204 is to record, for each of a plurality of traversal runs conducted with "Menu Elements (1)-(3)" designated as a target element, a user traversal path 350 that is traversed to reach the then-named target element. The tracking engine 204 is to calculate, for each of the target elements, a number of occurrences 352 of that each menu path 350 is traversed during the plurality of traversal runs.

The recommendation engine 206 is to in turn generate a recommendation to relocate a first element among the plurality of elements 304 to a new position within the menu 208 according to a rule. The rule includes, for each of the plurality of menu elements 304 considered as target elements, a comparison of an average 354 of recorded values of the counter 310 against an expected counter value 314 to determine whether the current target element position has an average recorded value of the counter that exceeds the expected counter value. The rule then prescribes identification of a first element (here "Menu Element 1") 356 from among the target elements identified as having average counter values 354 that exceed the respective expected counter values 314 (in this example, "Menu Element 1" 356 and "Menu Element 3" 370). The rule then prescribes identification of a new position for the first element 356 that is position within a first path 358 "1-A-2" that ends with the selection of first element 356 ("Menu Element 1"), and that has a highest number 360 of occurrences 352 relative to other paths that end with selection of the first element 356. In an example, the new position for "Menu Element 1" may be position "1-A" in the menu 302, given that position "1-A" 360 was a menu target in the identified path 358 that has the highest number (40) 370 of occurrences 352 among paths 350 ending with the first element ("Menu Element 1") 356.

In the foregoing discussion, engines 202, 204, 206 were described as combinations of hardware and programming. Engines 202, 204, 206 may be implemented in a number of fashions. Looking at FIG. 4, the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as a menu module 406, a tracking module 408, and a recommendation module 410. Menu module 406 represents program instructions that when executed may cause processing resource 404 to cause the implementation of menu engine 202 of FIG. 2. Tracking module 408 represents program instructions that when executed cause processing resource 404 to cause the implementation of tracking engine 204 of FIG. 2. Recommendation module 410 represents program instructions that when executed cause processing resource 404 to cause the implementation of recommendation engine 206 of FIG. 2.

Figure 5A:
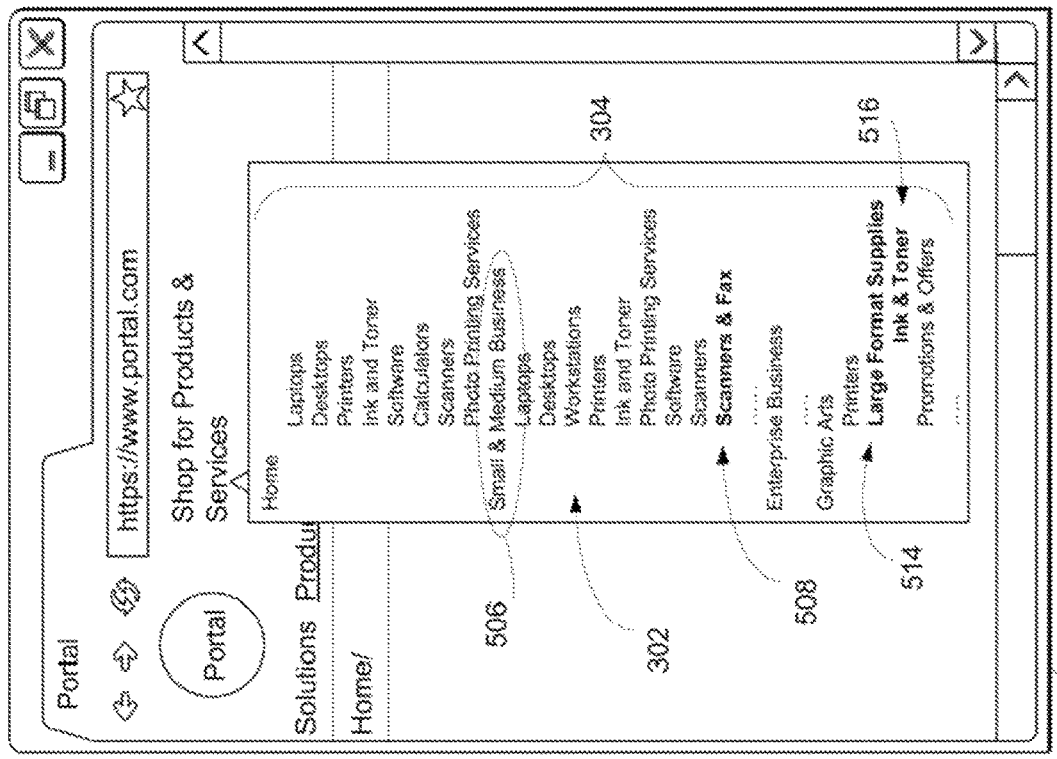
FIG. 5 is a screenshot depicting an illustrative example of application menu modification recommendations.
Figure 5B:
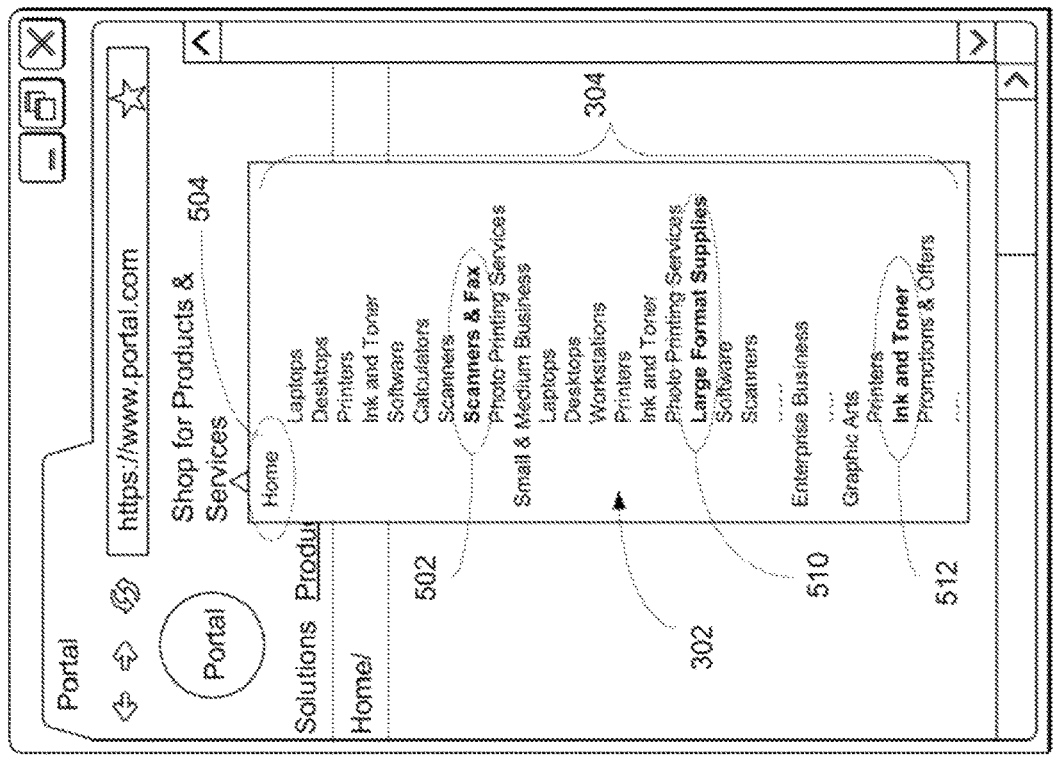

ILLUSTRATIVE EXAMPLE: FIGS. 5A and 5B are screenshots of displays presented via a display apparatus such as display apparatus 118 (FIG. 1), the screenshots depicting an illustrative example of application menu modification recommendations. In this example, system for recommending application menu modifications 102 identifies within a web application a graphical user interface menu 302 and a plurality of graphical user interface menu elements 304 included within the menu. In this example, system 102 performs a set of user menu traversal tracking measures with respect to a target element 502 from the plurality. In this example the target menu element 502 is the "Scanners & Fax" menu element that is a second tier element with respect to a "Home" first tier element 504.

The set of tracking measures includes identifying whether an identified menu traversal action, e.g., an action initiated by a user via interaction with a user interface such as user interface 120 (FIG. 1), is one that does, or one that does not, select the target element 502. Responsive to identifying a user menu traversal action that is not a selection of the target element, system 102 increments the value of a counter 308 (FIG. 3A). Responsive to identifying a user menu traversal action that is a selection of the target element 502, system 102 records the value 320 (FIG. 3A) of the counter 308 in association with data indicative of the target element 502.

Next system 102 generates, in consideration of the recorded counter value 320 (FIG. 3A) and other recorded counter values 310 (FIG. 3A), a recommendation 318 (FIG. 3A) to relocate one or more of the plurality of menu elements 304 to a new location or locations within the menu 302. In this example, the generated recommendation is to move the target menu element "Scanners & Fax" 502 from beneath the "Home" first tier element 504, to a more appropriate (e.g., more user-friendly) location in the menu 302, e.g., to be a second tier element beneath a Small & Medium Business 506 first tier element. In examples, the generated recommendation 318 (FIG. 3A) may be utilized within system 112, provided to another system, or provided to a user, with system 112, the other system, or the user causing relocation of the "Scanners & Fax" menu element 502 to a new position 508.

In the example of FIGS. 5A and 5B, system 102 performs the set of traversal tracking measures successive times, with each of the plurality of elements at some point designated as the target element such that each of the plurality of elements 304 will have an associated recorded value. In this example, system 102 additionally compares the recorded counter values indicating menu traversal activity for the "Large Format Supplies" 510, and "Ink and Toner" 512 menu elements to expected counter values, and in turn generates a recommendation or recommendations that the "Large Format Supplies" 510 and "Ink and Toner" 512 menu elements be relocated within the menu 302. In an example, system 102 may provide the generated recommendation or recommendations to a relocation service executing in conjunction with system 102, with the relocation service causing relocation of the "Large Format Supplies" 510 and "Ink and Toner" 512 menu elements to new locations 514 and 516 as shown in FIG. 5B.

Figure 6:
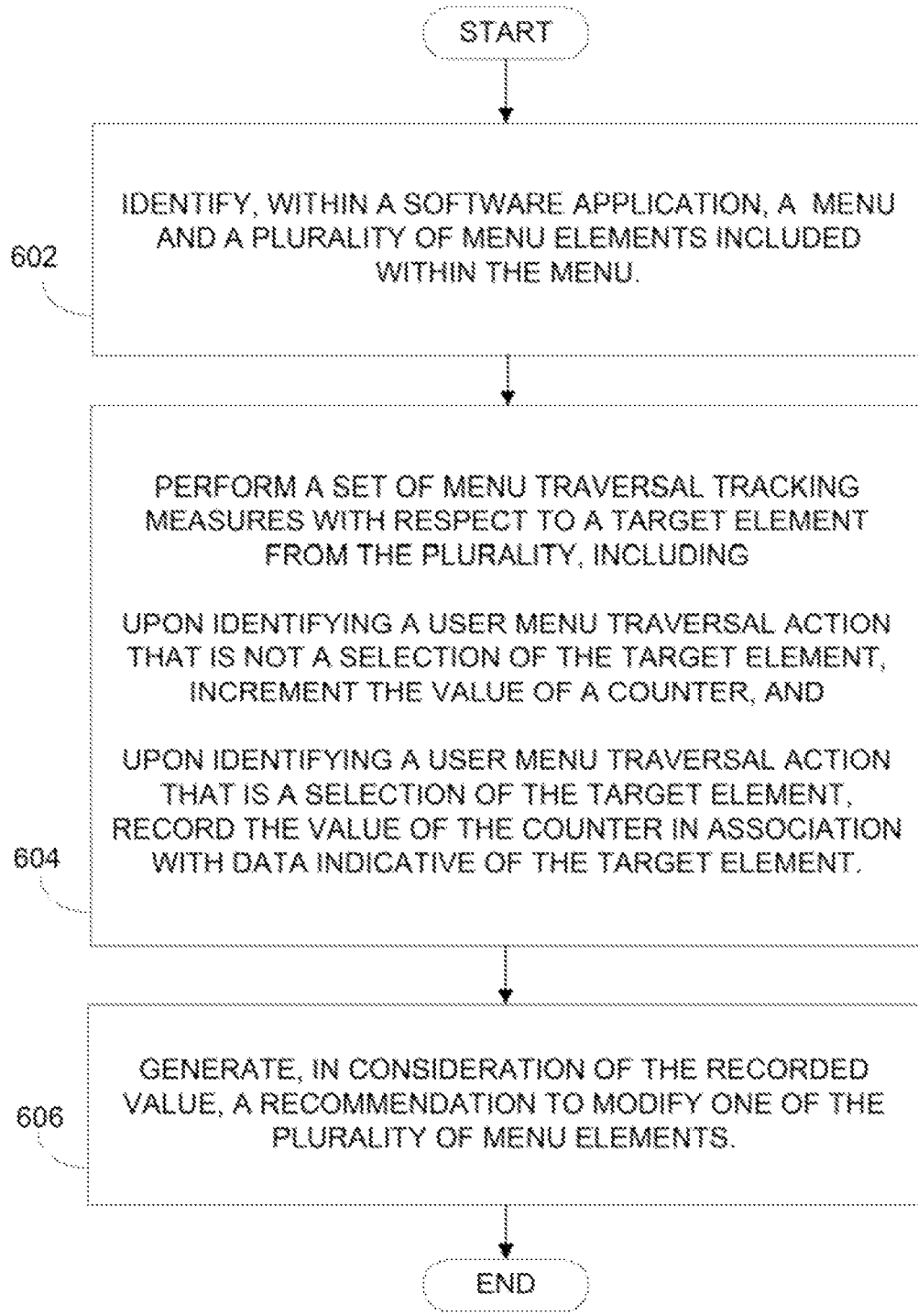
FIG. 6 is a flow diagram depicting steps taken to implement an example.

OPERATION: FIG. 6 is a flow diagram of steps taken to implement a method for applying management actions to calendar conflicts. In discussing FIG. 6, reference may be made to the components depicted in FIGS. 2 and 4. Such reference is made to provide contextual examples and not to limit the manner in which the method depicted by FIG. 6 may be implemented.

A menu and a plurality of menu elements, included within the menu, are identified within a software application (block 602). Referring back to FIGS. 2 and 4, menu engine 202 (FIG. 2) or menu module 406, when executed by processing resource 404, may be responsible for implementing block 602.

A set of menu traversal tracking measures are performed with respect to a target element from the plurality of menu elements. The set of menu traversal tracking measures includes incrementing the value of a counter responsive to identifying a user menu traversal action that is not a selection of the target element. The set of menu traversal tracking measures additionally includes recording the value of the counter in association with data indicative of the target element, responsive to identifying a user menu traversal action that is a selection of the target element (block 604). Referring back to FIGS. 2 and 4, tracking engine 204 (FIG. 2), or tracking module 408, when executed by processing resource 404, may be responsible for implementing block 604.

A recommendation to modify a first menu element is generated in consideration of the recorded value. The first menu element is an element among the plurality of menu elements (block 606). Referring back to FIGS. 2 and 4, recommendation engine 206 (FIG. 2), or recommendation module 410, when executed by processing resource 404, may be responsible for implementing block 606.

Figure 7:
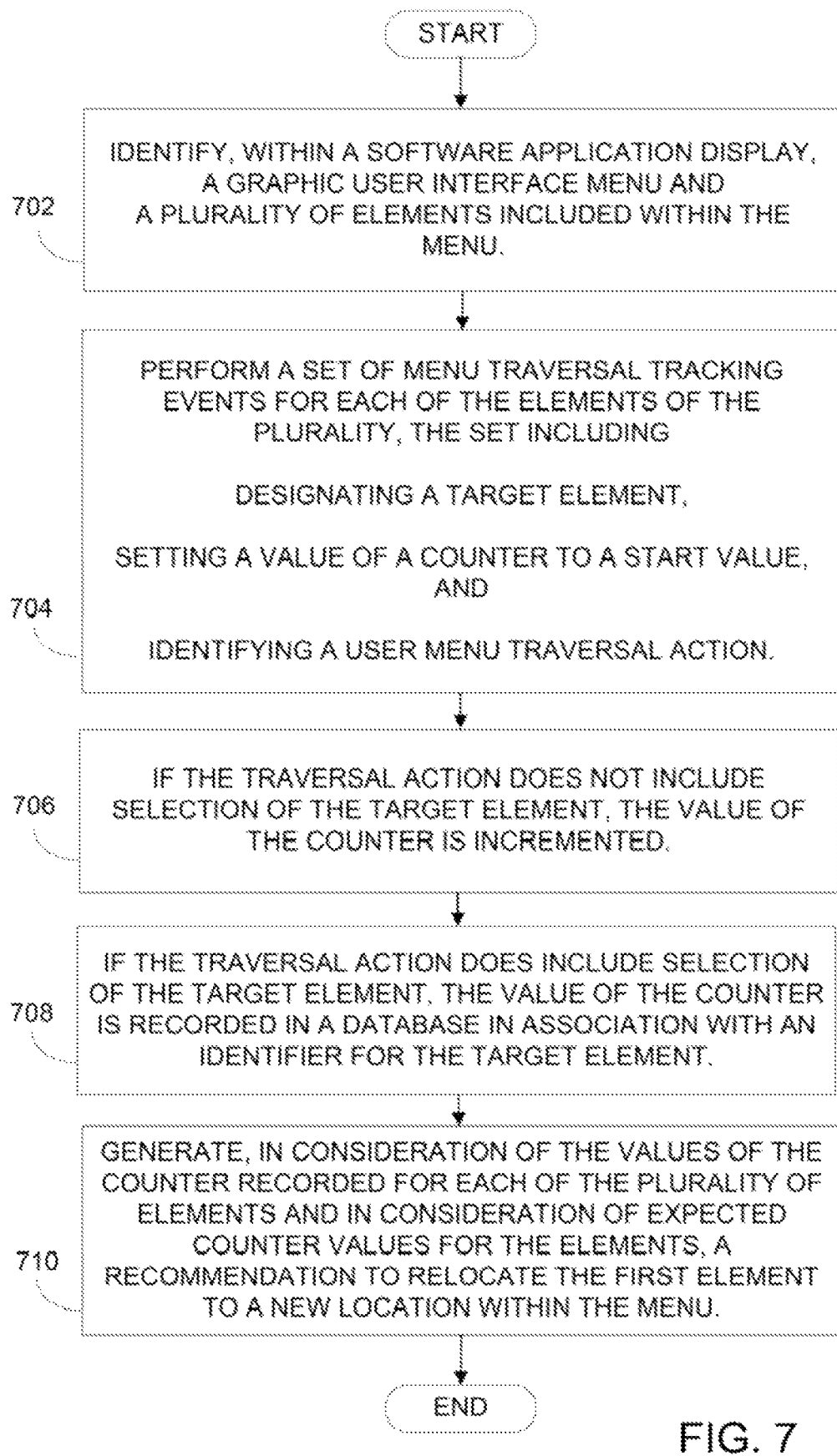
FIG. 7 is another flow diagram depicting steps taken to implement an example.

FIG. 7 is a flow diagram of steps taken to implement a method for applying management actions to calendar conflicts. In discussing FIG. 7, reference may be made to the components depicted in FIGS. 2 and 4. Such reference is made to provide contextual examples and not to limit the manner in which the method depicted by FIG. 7 may be implemented.

A graphical user interface menu, and a plurality of elements included within the menu, are identified within a software application display (block 702). Referring back to FIGS. 2 and 4, menu engine 202 (FIG. 2) or menu module 406, when executed by processing resource 404, may be responsible for implementing block 702.

A set of menu traversal tracking events are performed for each of the elements of the plurality of menu elements. The set of tracking events includes designating a target element, setting a value of a counter to a start value, and identifying a user menu traversal action (block 704). Referring back to FIGS. 2 and 4, tracking engine 204 (FIG. 2) or tracking module 408, when executed by processing resource 404, may be responsible for implementing block 704.

If the traversal action does not include selection of the target element, the value of the counter is incremented (block 706). Referring back to FIGS. 2 and 4, tracking engine 204 (FIG. 2) or tracking module 408, when executed by processing resource 404, may be responsible for implementing block 706.

If the traversal action does include selection of the target element, the value of the counter is recorded in a database in association with an identifier for the target element (block 706). Referring back to FIGS. 2 and 4, tracking engine 204 (FIG. 2) or tracking module 408, when executed by processing resource 404, may be responsible for implementing block 706.

A recommendation to relocate the first element to a new location within the menu is generated. The recommendation is generated in consideration of the values of the counter recorded for each of the plurality of elements and in consideration of expected counter values for the elements (block 708). Referring back to FIGS. 2 and 4, recommendation engine 206 (FIG. 2) or recommendation module 410, when executed by processing resource 404, may be responsible for implementing block 708.

CONCLUSION: FIGS. 1-7 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 6 and 7 show specific orders of execution, the orders of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A non-transitory computer readable storage medium storing instructions that when executed cause a processing resource to:
    display a menu including a plurality of menu elements;
    perform a set of menu traversal tracking measures that tracks a total number of user traversal actions taken by a user on the menu from a time the menu is initially displayed until a time a target menu element of the plurality of menu elements on the menu is selected by the user, wherein the user traversal actions are user-initiated movements on or across the menu, including instructions that cause the processing resource to:
    in response to the initial display of the menu, set a value of a counter to zero,
    subsequent to the initial display of the menu, count the number of user traversal actions performed on the menu before the target menu element is selected, by incrementing the value of the counter each time one of the user traversal actions on the menu is identified, and
    in response to the target menu element being selected, record the value of the counter as the total number of user traversal actions performed on the menu before the target menu element is selected; and
    in response to the recorded value of the counter being greater than a threshold number, generate a recommendation to modify the selected target menu element on the menu.

2. The non-transitory computer readable storage medium of claim 1, wherein the menu is a graphical user interface menu, and the plurality of menu elements are graphical user interface menu elements.

3. The non-transitory computer readable storage medium of claim 1, wherein the modification is to relocate the selected target menu element to a new location within the menu.

4. The non-transitory computer readable storage medium of claim 1, wherein the instructions that cause the processing resource to perform the set of menu traversal tracking measures include instructions that cause the processing resource to perform the set of menu traversal tracking measures successive times, with each of the plurality of menu elements being designated as the target menu element such that each of the plurality of menu elements has an associated recorded value; and
    wherein the recommendation is generated based on the recorded values of the counter associated with the plurality of menu elements.

5. The non-transitory computer readable storage medium of claim 1, wherein the application is a web application.

6. The non-transitory computer readable storage medium of claim 1, wherein the instructions that cause the processing resource to perform the set of menu traversal tracking measures include instructions that cause the processing resource to set the counter to a start value responsive to detecting repetitive user selections of a same menu element from the plurality of menu elements over a specific period of time.

7. The non-transitory computer readable storage medium of claim 1, wherein the menu and the plurality of menu elements are to appear in a first page display, and wherein the instructions that cause the processing resource to perform the set of menu traversal tracking measures include instructions that cause the processing resource to set the counter to a start value responsive to detecting a user action to cause loading of a second page display.

8. The non-transitory computer readable storage medium of claim 1, wherein the instructions that cause the processing resource to perform the set of menu traversal tracking measures include instructions that cause the processing resource to set the counter to a start value after identifying the user selection of the target menu element.

9. The non-transitory computer readable storage medium of claim 1, wherein the instructions that cause the processing resource to perform the set of menu traversal tracking measures include instructions that cause the processing resource to perform the set of menu traversal tracking measures for each of a plurality of menu traversal runs, and wherein the generation of the recommendation is based on an average of recorded values of the counter.

10. The non-transitory computer readable storage medium of claim 1, wherein the instructions that cause the processing resource to perform the set of menu traversal tracking measures includes instructions that cause the processing resource to:
perform the set of menu traversal tracking measures for each of a plurality of menu traversal runs, including, for each of the menu traversal runs, recording a user traversal path to reach the target menu element;
calculate a number of occurrences of each user traversal path during the plurality of menu traversal runs;
for each of the target menu elements, compare an average of recorded values of the counter against a predetermined counter value; and
in response to a determination that the average of the recorded values of the counter exceeds the predetermined counter value, identify a menu position within a user traversal path that ends with the target menu element and has a highest number of occurrences as a new location for the target menu element.

11. A message delivery system to recommend application menu modifications, comprising:
a processor; and
a memory storing instructions that when executed cause the processor to:
display a menu, and a plurality of menu elements included within the menu;
perform a set of measures for tracking a total number of user menu traversals performed on the menu from a time the menu is initially displayed until a time a target menu element in the menu is selected, wherein the user menu traversals are user-initiated movements on or across the menu, including instructions that cause the processor to:
subsequent to the initial display of the menu, set a value of a counter to zero;
designate one of the plurality of menu elements as the target menu element;
subsequent to setting the value of the counter to zero, count the number of user menu traversals performed on the menu before the target menu element is selected by the user, by incrementing the value of the counter each time one of the user menu traversals is identified;
in response to the target menu element being selected, record in a database the value of the counter as the total number of user menu traversals performed on the menu before the target menu element is selected; and
in response to the recorded value of the counter being greater than a threshold number, generate a recommendation to modify the selected target menu element among the plurality of menu elements in the menu.

12. The system of claim 11, wherein the memory further stores instructions that cause the processor to set the counter to a start value upon detection of subsequent user selections of a same menu element from the plurality of menu elements over a specific period of time.

13. The system of claim 11, wherein the recommendation includes a recommendation to relocate the selected target menu element to a new position within the menu.

14. The system of claim 13, wherein the instructions that cause the processor to perform the set of measures for tracking the total number of user menu traversals include instructions to cause the processor to:
perform the set of measures for each of a plurality of menu traversal runs, including, for each of the menu traversal runs, recording a user traversal path to reach the target menu element;
calculate a number of occurrences of each user traversal path during the plurality of menu traversal runs;
for each of the target menu elements, perform a comparison of an average of recorded values of the counter against a predetermined counter value; and
in response to a determination that the average of the recorded values of the counter exceeds the predetermined counter value, identify as the new position a menu position within a user traversal path that ends with the target menu element and has a highest number of occurrences.

15. A method for recommending modifications for application menus, comprising:
displaying, on a graphical user interface, a menu and a plurality of menu elements included within the menu;
performing, by a processor, a set of menu traversal tracking events that track a total number of user menu traversal actions taken by a user on the menu from a time the menu is initially displayed until a time a target menu element from the plurality of menu elements in the menu is selected by the user, wherein the user menu traversal actions are user-initiated movements on or across the menu, including
designating one of the plurality of menu elements as the target menu element,
setting a value of a counter to a start value,
subsequent to setting the value of the counter to the start value, counting the number of user menu traversal actions performed on the menu before the target menu element is selected, by incrementing the value of the counter each time one of the user menu traversal actions performed on the menu is identified, and
in response to the target menu element being selected, recording the value of the counter in a database as the total number of user menu traversal actions performed on the menu in association with an identifier for the target menu element; and
generating, by the processor, a recommendation to relocate the selected target menu element among the plurality of menu elements to a new location within the menu in response to a determination that the recorded value of the counter for the target menu element is greater than a threshold value.

16. The method of claim 15, wherein performing the set of menu traversal tracking events includes performing the set of menu traversal tracking events successive times, with each of the plurality of menu elements being designated as the target menu element such that each of the plurality of menu elements has an associated recorded value, and
wherein generating the recommendation is based on the recorded values of the counter associated with the plurality of menu elements.

17. The method of claim 15, wherein performing the set of menu traversal tracking events includes setting the counter to the start value in response to detecting repetitive user selections of a same menu element from the plurality of menu elements over a specific period of time.

18. The method of claim 15, wherein the menu and the plurality of menu elements are displayed on a first page display, and wherein the method further comprises setting the counter to the start value in response to detecting a user action to cause loading of a second page display.

19. The method of claim 15, wherein performing the set of menu traversal tracking events comprises:
- performing the set of menu traversal tracking events for each of a plurality of menu traversal runs, including, for each of the menu traversal runs, recording a user traversal path to reach the target menu element;
- calculating a number of occurrences of each user traversal path during the plurality of menu traversal runs;
- for each of the target menu elements, comparing an average of recorded values of the counter against a predetermined counter value; and
- in response to a determination that the average of the recorded values of the counter exceeds the predetermined counter value, identifying a menu position within a user traversal path that ends with the target menu element and has a highest number of occurrences as the new location for the target menu element.

* * * * *